United States Patent [19]

Ishima

[11] 4,165,514

[45] Aug. 21, 1979

[54] ELECTROSTATIC RECORDING MULTI-STYLUS ELECTRODE DEVICE

[75] Inventor: Kazumi Ishima, Kashiwa, Japan

[73] Assignee: Ricoh Co., Ltd., Japan

[21] Appl. No.: 905,045

[22] Filed: May 11, 1978

[30] Foreign Application Priority Data

May 16, 1977 [JP] Japan .................................. 52-56152

[51] Int. Cl.$^2$ .................... G03G 15/044; G01D 15/06

[52] U.S. Cl. ................................. 346/155; 346/139 C

[58] Field of Search ............... 346/155, 153, 162, 163, 346/139 C

[56] References Cited

U.S. PATENT DOCUMENTS

| | | | |
|---|---|---|---|
| 2,967,083 | 1/1961 | Gallentine | 346/139 C |
| 3,618,118 | 11/1971 | Lloyd | 346/155 |
| 3,624,661 | 11/1971 | Shebanow | 346/155 |
| 3,693,185 | 9/1972 | Lloyd | 346/155 |
| 3,718,936 | 2/1973 | Rice, Jr. | 346/139 C |
| 3,979,760 | 9/1976 | Tadauchi | 346/155 |
| 4,030,107 | 6/1977 | Tagawa | 346/139 C |

*Primary Examiner*—Jay P. Lucas

*Attorney, Agent, or Firm*—McGlew and Tuttle

[57] ABSTRACT

An electrostatic recording multi-stylus electrode device is capable of reducing significantly the electrostatic capacity between the connecting wires and between the lead wires of the multiple stylus electrodes of the electrode device by providing a plurality of insulating base plates, for supporting the wires, for each row of the multiple stylus electrodes so as to dispose the wires sufficiently apart from each other.

4 Claims, 8 Drawing Figures

ELECTROSTATIC RECORDING MULTI-STYLUS ELECTRODE DEVICE

BACKGROUND OF THE INVENTION

The present invention relates to an improved electrostatic recording multi-stylus electrode device for use with a facsimile apparatus for the like.

Conventionally, as an electrostatic recording multi-stylus electrode device for use with a facsimile or the like, a multi-stylus electrode as shown in FIGS. 1 to 3 is known. In the multi-stylus electrode device, a recording electrode comprising multiple stylus electrodes is arranged so as to face an auxiliary electrode in close proximity to the recording electrodes, and a recording medium comprising an insulating sheet is fed between the recording electrode and the auxiliary electrode, and voltage correlated to information to be recorded is applied across the recording electrode and the auxiliary electrode, and the recording medium is scanned by the electrodes so that a latent electrostatic image is formed on the recording medium, and by developing the latent image, the information is recorded on the recording medium.

Referring to FIG. 1, multiple stylus electrodes P are embedded in line in a rod-shaped electrode support member 1 made of a resin. In arranging the stylus electrodes P, it is necessary that the stylus electrodes are located as closely as possible in each row of the stylus electrodes in order to obtain a higher scanning density of the stylus electrodes. However, since it is technically difficult to embed the stylus electrodes closely in a single row so as to satisfy any desired line density of the stylus electrodes, they are embedded in zigzags, namely staggered, in two parallel rows as illustrated in FIGS. 1 and 3.

Assuming that one stylus electrode row is named "electrode row a—a," and the other "electrode row b—b," the stylus electrodes in the "electrode row a—a," for instance, which constitute a recording electrode are connected to lead wires $e_1, e_2, e_3, e_4, e_5, e_6, \ldots e_n$, which are extended from a plurality of common connecting wires $q_1, q_2, q_3, q_4, q_5, q_6$. These common connecting wires are disposed parallel to each other in an insulating base plate 2 for use with the "electrode row a—a."

It follows that each lead wire extended from a connecting wire is connected to a respective stylus electrode.

The same wiring procedure applies to the stylus electrodes in "electrode row b—b" with respect to the common connecting wire of an insulating base plate 3. One end of each common connecting wire is connected to a connector (not shown).

When a latent electrostatic image is formed, the insulating recording medium is fed between the recording electrode and the auxiliary electrode (not shown) disposed in close proximity to the recording electrode, and voltage correlated to an information signal is applied between the recording electrode and the auxiliary electrode through the connector so as to scan the insulating recording medium.

Practically, the insulating base plates 2, 3 and the electrode support member 1 are integrally made, for instance, of a resin as illustrated in FIG. 2 so as to form a multi-stylus electrode device 4 as a whole.

In FIG. 1, however, for a better understanding of the muti-stylus electrode device 4, it is divided into the insulating base plates 2, 3 and the electrode support member 1. FIG. 3 indicates the wiring of the multi-stylus electrode device 4.

As can be seen from these figures, the stylus electrodes P embedded in the electrode row a—a, for example, are connected to the common connecting wires $q_1, q_2, q_3, q_4, q_5, q_6$, which are all disposed in one and the same insulating base plate 2, through the lead wires $e_1, e_2, e_3, e_4, e_5, e_6, \ldots e_n$.

In this type of the conventional multi-stylus electrode device, when voltage is applied to the multi-stylus electrode device in order to form a latent electrostatic image on the recording medium, capacitors are formed between the respective lead wires $e_1, e_2, e_3, e_4, e_5, \ldots e_n$ and between the respective common connecting wires $q_1, q_2, q_3, q_4, q_5, q_6$ and their respective floating electrostatic capacity becomes too great to be ignored. The term "floating electrostatic capacity" used herein refers to the electrostatic capacity of the capacitors formed by the respective lead wires and the respective common connecting wires.

Basically considered, it is desirable to minimize such a floating electrostatic capacity since, as it increases, the performance of a recording apparatus employing this type of the recording multi-stylus electrode device is considerably hindered with a waste of a driving power for the recording apparatus and with reduction of image density.

SUMMARY OF THE INVENTION

It is therefore principal object of the invention to provide an improved electrostatic recording multi-stylus electrode device capable of minimizing the formation of capacitors between the connecting wires and between the lead wires connecting the connecting wires to the multiple stylus electrodes of the electrostatic recording multi-stylus electrode device.

According to the invention, a plurality of insulating base plates are provided for supporting the connecting wires which are connected to the multiple stylus electrodes in each row so that the connecting wires can be disposed sufficiently apart from each other. Accordingly, the lead wires are also disposed sufficiently apart from each other. By this arrangement of the connecting wires and the lead wires, the floating electrostatic capacity between the respective connecting wires and that between the respective lead wires are reduced significantly. The power concumption of the electrostatic recording apparatus can also be reduced by employing the multi-stylus electrode device according to the invention. Moreover, image density can be raised, and the response of the multi-stylus electrode device to input information signals can be more accurate.

BRIEF DESCRIPTION OF THE DRAWINGS

For a better understanding of the invention as well as the other objects and features, reference will be had to the following detailed description which is to be read in conjunction with the drawings wherein.

DETAILED DESCRIPTION OF THE PREFERRED EMBODIMENTS

Figure 1:
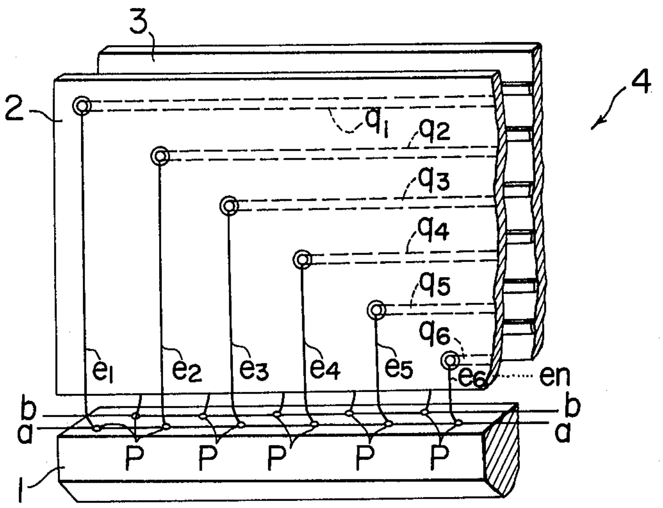
FIG. 1 is a schematic perspective view of a conventional electrostatic recording multi-stylus electrode, partly cut away for showing the components of the conventional electrostatic recording multi-stylus electrode.
Figure 2:
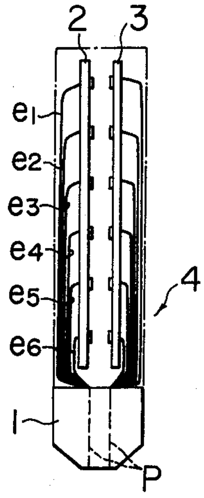
FIG. 2 is a schematic sectional view of the electrostatic recording multi-stylus electrode of FIG. 1.
Figure 3:
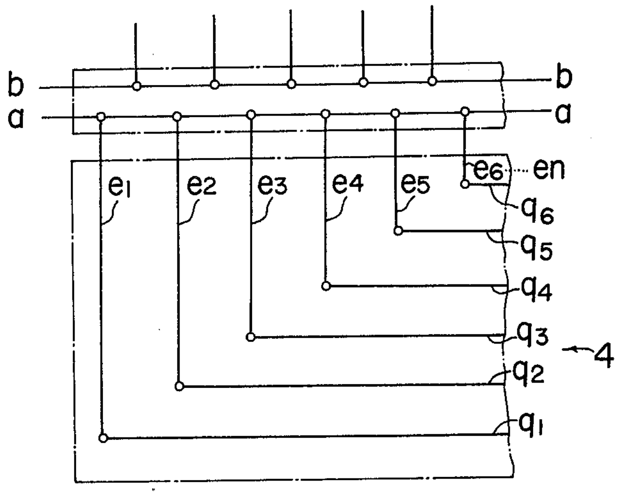
FIG. 3 illustrates the wiring of the electrostatic recording multi-stylus electrode of FIG. 1.
Figure 4:
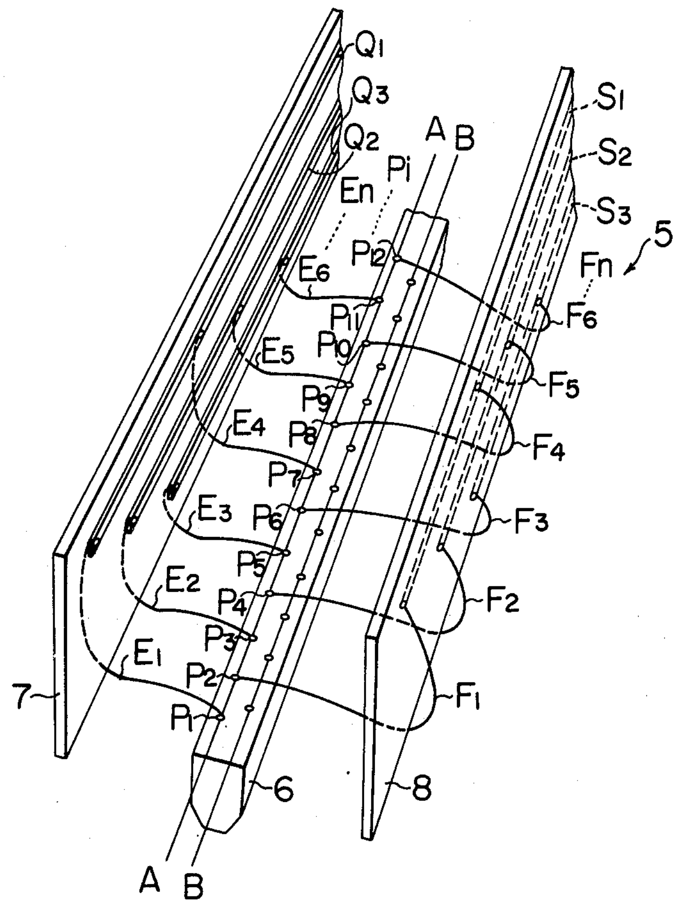
FIG. 4 is a schematic fragmentary perspective view of an embodiment of an electrostatic recording multi-stylus electrode according to the invention.
Figure 5:
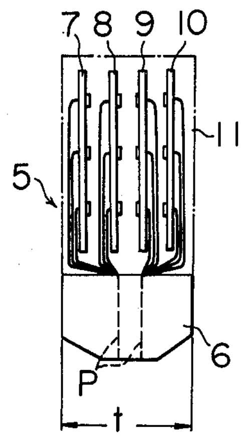
FIG. 5 is a schematic end view of the electrostatic recording multi-stylus electrode of FIG. 4.
Figure 6:
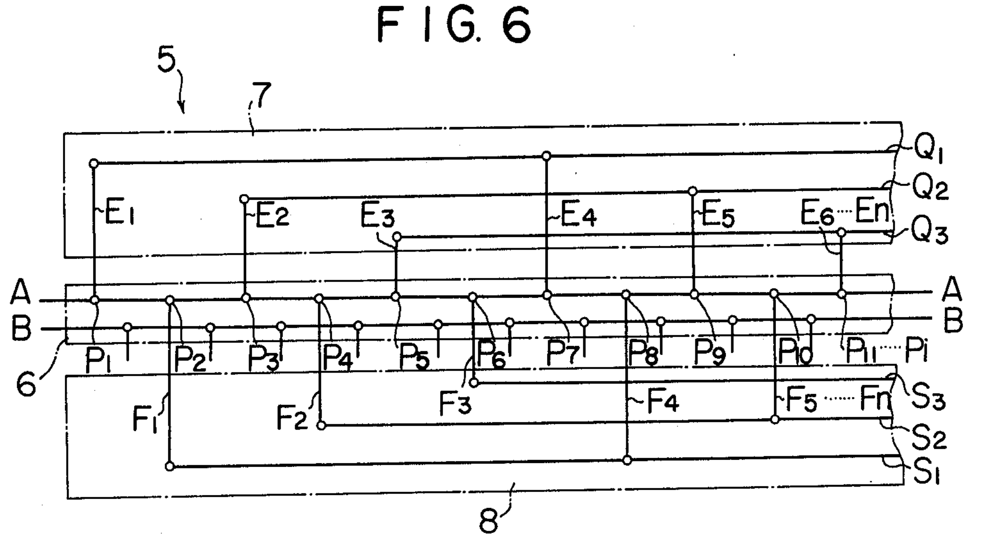
FIG. 6 illustrates the wiring of the electrostatic recording multi-stylus electrode of FIG. 4.

Referring to FIG. 4, there is shown the main portion of an embodiment of a multi-stylus electrode device 5 according to the invention. FIG. 5 is a schematic end view of the multi-stylus electrode device 5, and FIG. 6 shows the wiring of the multi-stylus electrode device 5. As in the foregoing conventional multi-stylus electrode device 4, the multiple stylus electrodes of the invention are embedded in a rod-shaped electrode support member 6, made of a resin, in two rows so as to form an electrode row A—A and an electrode row B—B. Taking the electrode row A—A, for example, the embedded stylus electrodes of the electrode row A—A are alternately connected to lead wires $E_1, E_2, E_3, \ldots E_n$ extended from common connecting wires $Q_1, Q_2, Q_3$ disposed on an insulating base plate 7, and to lead wires $F_1, F_2, F_3, \ldots F_n$ extended from common connecting wires $S_1, S_2, S_3$ disposed on an insulating base plate 8.

More specifically, a stylus electrode $P_1$ is connected to the lead wire $E_1$; a stylus electrode $P_2$ adjacent the stylus electrode $P_1$ is connected to the lead wire $F_1$; a stylus electrode $P_3$ adjacent the stylus electrode $P_2$ is connected to the lead wire $E_2$; thereafter the respective stylus electrodes are connected to the respective lead wires in the same manner, so that the lead wires $E_1, E_2, E_3, \ldots E_n$ on the insulating base plate 7 and the lead wires $F_1, F_2, F_3, \ldots F_n$ on the insulating base plate 8 are alternately connected to the stylus electrodes ($P_1, P_2, \ldots, P_i$).

When the invention is placed in practice, the number of the common connecting wires is not limited to the number illustrated in the figure.

For a better understanding of the invention, the two insulating base plates 7, 8 for use with the electrode A—A are illustrated in FIGS. 4 and 6, but two insulating base plates 9, 10 for use with the electrode row B—B are not shown in those figures. However, for practical use, the electrode row B—B is connected to the insulating base plates 9, 10 in the same manner as in the connection of the electrode row A—A to the insulating base plates 7, 8. FIG. 5 illustrates the whole construction of the multi-stylus electrode device 5, in which the four insulating base plates 7, 8, 9, 10 and the electrode support are arranged to be located within the thickness t of the electrode support member 6 and are made integral therewith by a resin 11.

In the invention, the number of the common connecting wires to be disposed on one insulating base plate can be reduced significantly in comparison with that of the common connecting wires in the conventional multi-stylus electrode device 5. Therefore, the maximum length of the lead wire $E_1$ and that of the lead wire $F_1$ in the invention can be reduced to about 2/5 of the maximum length of the lead wire $e_1$ of the prior art. Furthermore, the distance between the respective lead wires on each insulating base plate can be doubled in comparison with the prior art.

Figure 7:
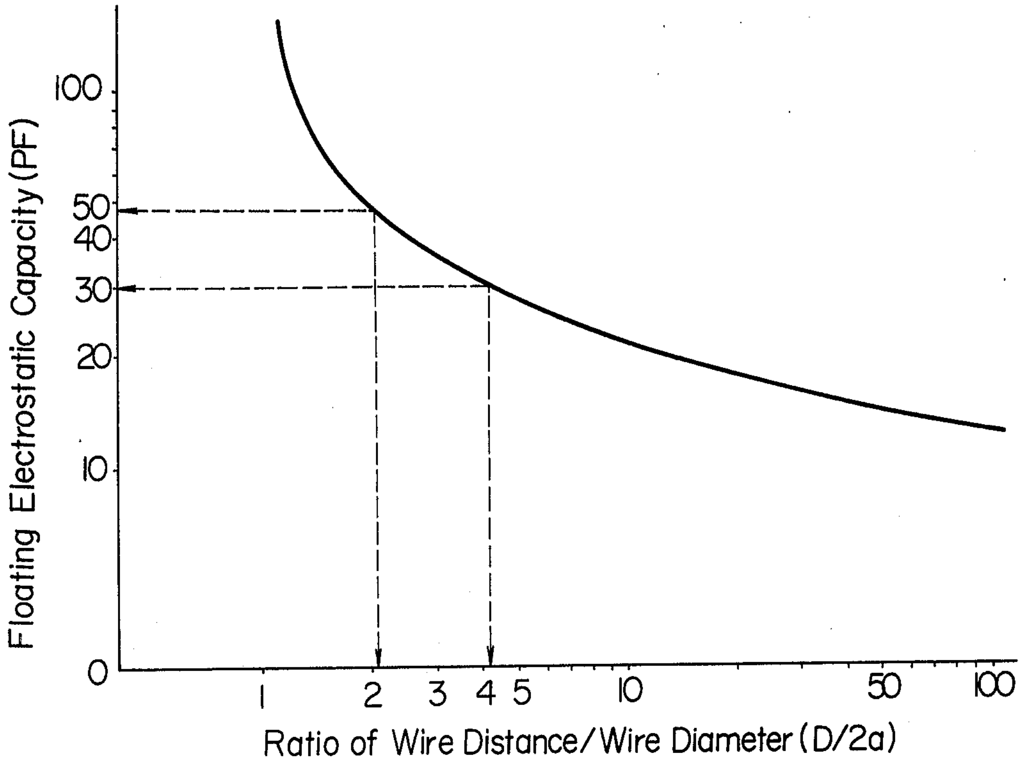
FIG. 7 is a graph indicating a relationship between the floating electrostatic capacity of the electrostatic multi-stylus electrode device and the ratio of the distance between the lead wires connected to the stylus electrodes to the diameter of the lead wires.

The actions and effects of the invention, which can be distinguished from those of the prior art, are as follows. As mentioned above, most of the floating electrostatic capacity of the multi-stylus electrode devices 4, 5 exists between the common connecting wires and the stylus-electrodes, and its capacity is given by the following equation.

$$C = \frac{\pi \epsilon_o \epsilon_s l_1}{\log\{D/a \pm \sqrt{(D/a)^2 - 1}} (F/m) \quad (1)$$

where C is the floating electrostatic capacity (F/m); $\epsilon_0$ is the dielectric constant in vacuum; $\epsilon_s$ is the specific dielectric constant; D/a is the ratio of the distance between the lead wires connected to the stylus electrodes to the diameter of the lead wires; and $l_1$ is the maximum length of the lead wires connected between the common connecting wires and the stylus electrodes. According to equation (1), the floating electrostatic capacity C varies in proportion to the maximum length $l_1$ and also varies approximately logarithmically with respect to the ratio D/a. As mentioned previously, according to the invention, it is possible to reduce the value of $l_1$ in equation (1) to 2/5 of the conventional $l_1$ and to double the value of D. FIG. 7 is a graph indicating a relationship between the ratio of the distance of the wires to the diameter of the wires and the electrostatic capacity which was obtained by substituting the respective values in the equation (1) with the actual values of a practical multi-stylus electrode. When the diameter of the wires is supposed to be constant, the present graph can be used for comparing the invention with the prior art. To be more specific, assuming that the ratio of the distance between the wires of the conventional multi-stylus electrode plate to the wire diameter is 2.1, floating electrostatic capacity corresponding to the above-mentioned ratio is determined to be 48 (PF/m) from the graph in FIG. 7. In the multi-stylus electrode according to the invention, since the distance between the wires becomes two times the distance between the conventional wires when the other conditions are unchanged, the ratio of the distance between the wires to the wire diameter becomes 4.2, and the floating electrode capacity corresponding to this ratio is 30 (PF/m). Furthermore, in the invention, since the value of $l_1$ in the equation (1) is reduced to 2/5 of the conventional $l_1$, the floating electrostatic capacity becomes $2/5 \times 30$ (PF/m), that is, 12 (PF/m). According to the invention, the floating electrostatic capacity can be reduced significantly from 48 (PF/m) to 12 (PF/m). The reduction ratio of the floating electrode capacity is calculated at 75%. However, the result obtained by a prototype multi-stylus electrode plate according to the invention showed that the reduction ratio was approximately 76.7%.

Figure 8:
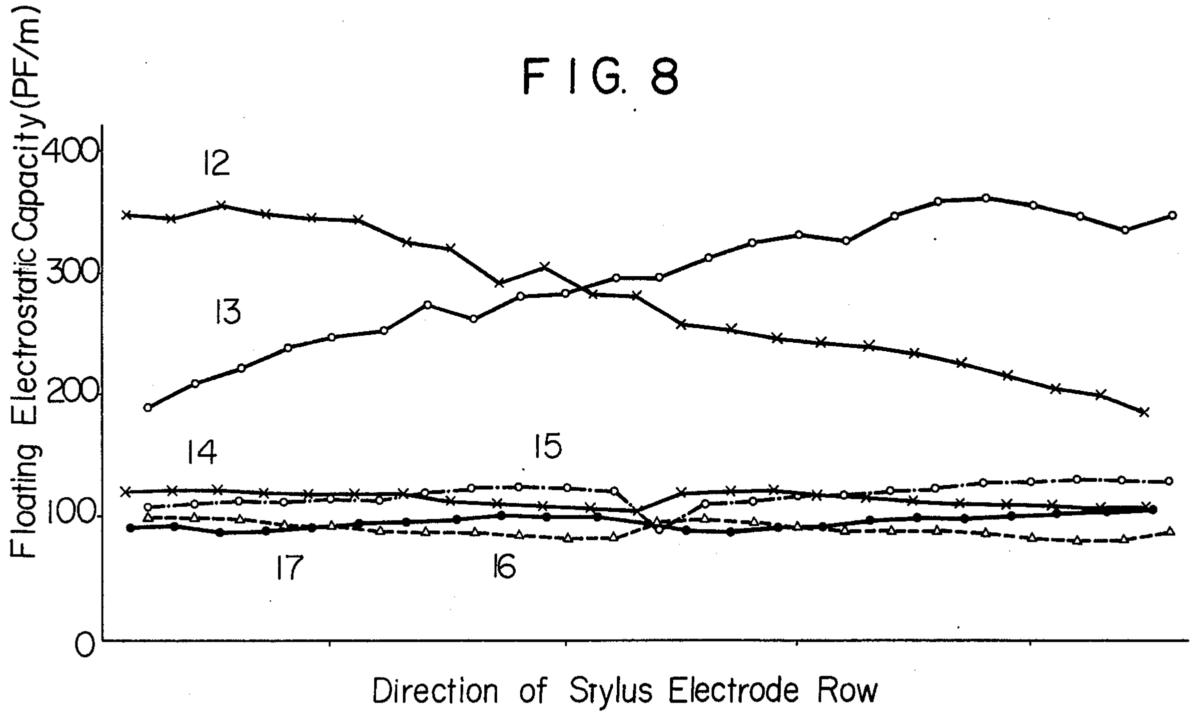
FIG. 8 is a graph comparing the floating electrode capacity of the conventional multi-stylus electrode device with that of the electrostatic recording multi-stylus electrode device of the invention.

Referring to FIG. 8, the found values of the floating electrode capacity are plotted with a predetermined space therebetween in the direction of the electrode rows of each insulating base plate of the conventional multi-stylus electrode plate as shown by the curves 12, 13. Furthermore the found values of the floating electrode capacity according to the invention are plotted with a predetermined space therebetween in the direction of the electrode rows of each insulating plate of the multi-stylus electrode plate, as shown by the curves 14, 15, 16, 17 for comparison. In the graph of FIG. 8, the curve 12 corresponds to the insulating base plate 2; the curve 13 to the insulating base plate 3; the curves 14, 15, 16, 17 correspond to the insulating base plates 7, 8, 9, 10, respectively.

While a specific embodiment of the invention has been shown and described in detail to illustrate the application of the principles of the invention, it will be understood that the invention may be embodied otherwise without departing from such principles.

What is claimed is:

1. In an electrostatic recording multi-stylus electrode device for use with a facsimile apparatus or the like, the improvement comprising:

a plurality of stylus electrodes (P) embedded in at least one row (A—A) in an electrode support member (6), a plurality of spaced insulating base plates (7,8) supporting a plurality of connecting wires (Q) for selectively applying voltage to said electrodes, said connecting wires (Q) being spaced apart from each other to reduce electrostatic capacity therebetween, lead wires (E,F) for connecting each of said stylus electrodes (P) to selected ones of said connecting wires (Q), said lead wires (E,F) being spaced from each other so as to reduce electrostatic capacity therebetween, the spacing of said connecting wires (Q) and said lead wires (E,F) being selected to minimize a floating electrostatic capacity (C) therebetween, each stylus electrode (P) in said row (A—A) being connected to one of said connecting wires (Q) on one of said insulating base plates (7) with an adjacent stylus electrode (P) in said row (A—A) being connected to one of said connecting wires (Q) on another of said base plates (8).

2. The improvement of claim 1 further including a second plurality of stylus electrodes embedded in a second row (B—B) in said electrode support member (6), said first-mentioned plurality of stylus electrodes and said second plurality of stylus electrodes being disposed in said first-mentioned and second rows in staggered fashion.

3. An electrostatic recording multi-stylus electrode device as claimed in claim 2, wherein a pair of said insulating base plates are provided for each row of said stylus electrodes embedded in said electrode support member.

4. The improvement of claim 3 wherein said electrode support member has a selected thickness and said insulating base plates are all arranged so as to be within the thickness of said electrode support member.

* * * * *